Dec. 15, 1936.   T. C. GRAY   2,064,534
PISTON ROD GUIDE FOR REVERSE GEARS
Filed June 7, 1934   2 Sheets-Sheet 1
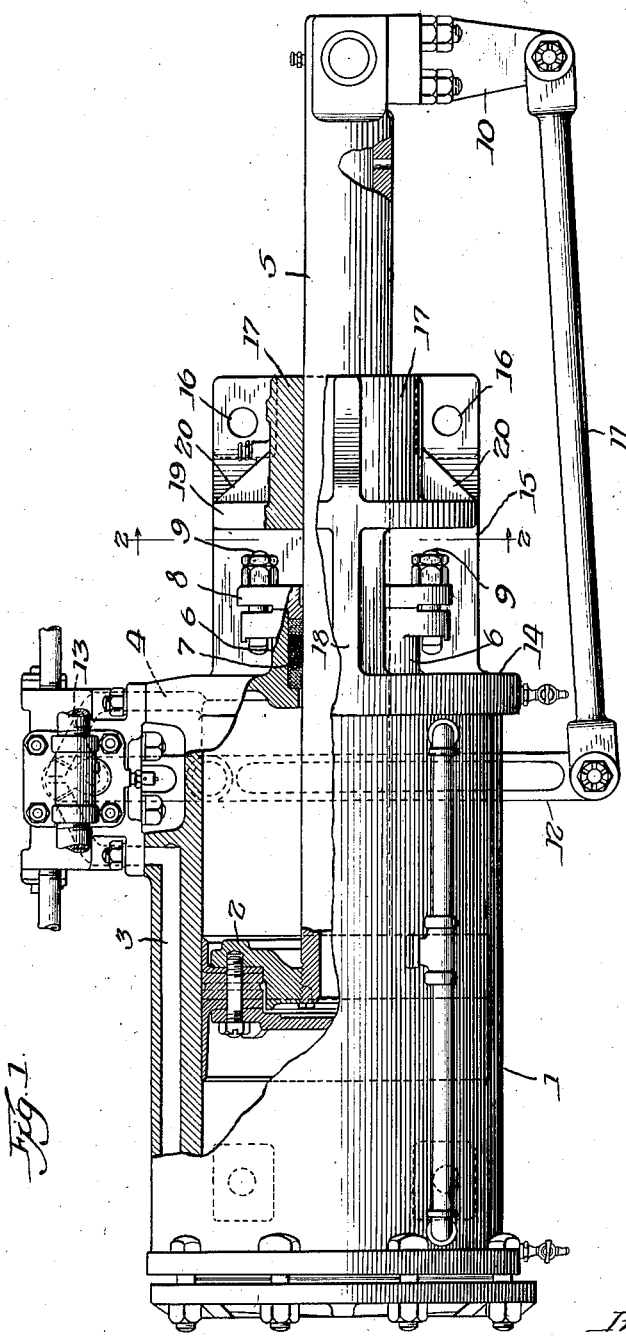

Dec. 15, 1936. T. C. GRAY 2,064,534
PISTON ROD GUIDE FOR REVERSE GEARS
Filed June 7, 1934 2 Sheets-Sheet 2
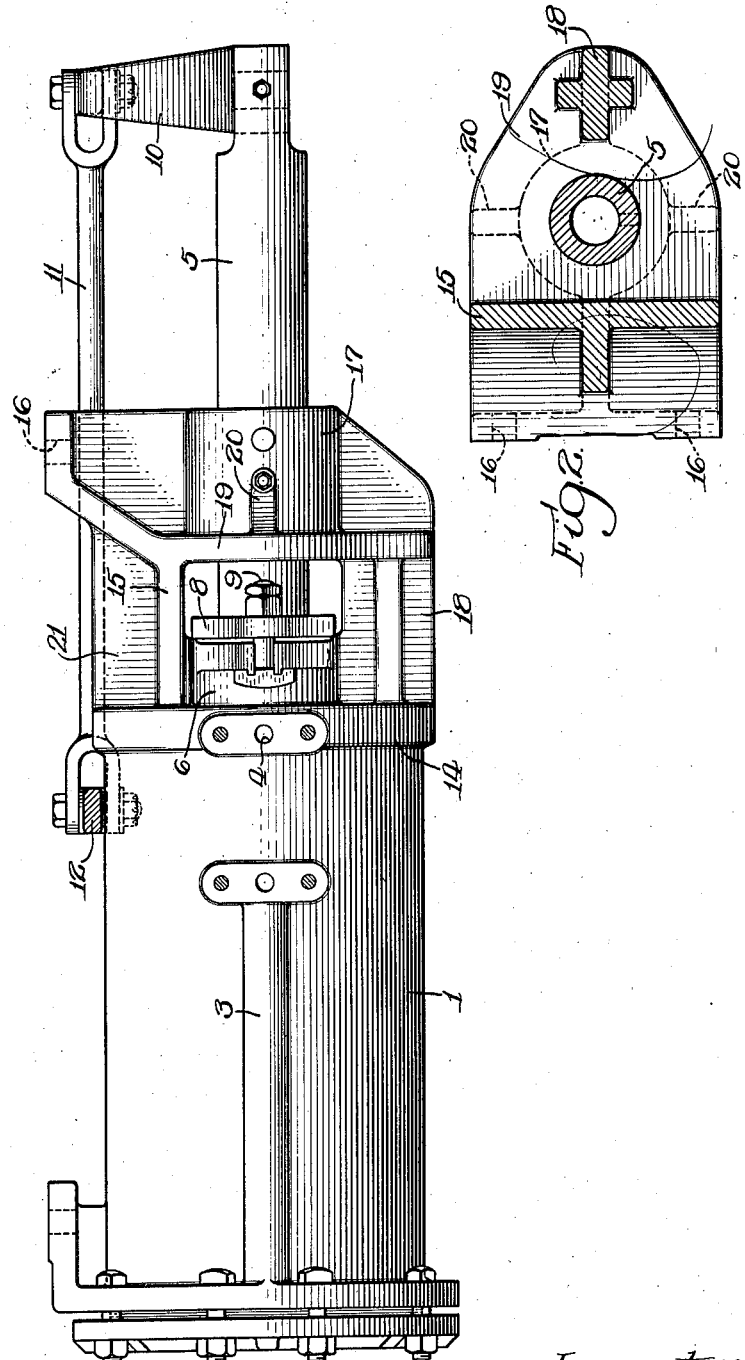
Inventor:-
Thomas C. Gray,
By Wilson, Dowell, McCanna & Foley attys.

Patented Dec. 15, 1936

2,064,534

UNITED STATES PATENT OFFICE 2,064,534

PISTON ROD GUIDE FOR REVERSE GEARS

Thomas C. Gray, Evanston, Ill., assignor to Barco Manufacturing Co., Chicago, Ill., a corporation of Illinois Application June 7, 1934, Serial No. 729,412

2 Claims. (Cl. 308—4)

This invention relates to power reverse gears for shifting locomotive valve motions, although it will be obvious that it is also capable of other applications. The present application constitutes a continuation in part of application Serial No. 668,508, filed April 29, 1933, issued February 4, 1936, as Patent No. 2,029,404.

In reverse gears of the type herein illustrated, the piston rod projects from one end of the power cylinder through a packing gland, the outer end of the rod being connected by a link to the floating lever which actuates the operating fluid control valves. In operation this piston rod is subjected to transverse strains which cause the packing gland to wear rapidly, resulting in leakage from the cylinder along the rod.

To obviate this wear, it has heretofore been proposed to connect the end of the rod with a crosshead adapted to reciprocate in suitable guideways which take up the lateral thrust on the rod and maintain the rod in alignment with its packing gland so that it will reciprocate therethrough without excessive wear.

The primary purpose of my present invention is to eliminate the cumbersome and expensive crosshead and guideways therefor, without permitting the lateral strains exerted on the piston rod to be transmitted to the packing gland. This result I accomplish by providing the cylinder with an integral extension which affords a bearing for the piston rod outwardly beyond the packing gland, and in axial alignment therewith so that the piston rod is firmly guided in its reciprocatory movements, thereby eliminating lateral thrust of the rod against the packing gland and consequent wear thereof.

A preferred embodiment of the invention is illustrated on the accompanying drawings, from which it will be observed that:

Fig. 1 is a side elevation of a power reverse gear cylinder, certain portions being broken away to illustrate the underlying parts;

Fig. 2 is a vertical sectional view on line 2—2 of Fig. 1; and

Fig. 3 is a top view of the cylinder omitting the valve structures.

Referring to the drawings more in detail, reference character 1 designates a cylinder within which the piston 2 is adapted to be reciprocated by fluid pressure admitted and exhausted through the passages 3 and 4, respectively, the admission and exhaust of the fluid being controlled by suitable inlet and exhaust valves of any preferred construction.

The piston rod 5 projects from one face of the piston 2 through a packing gland 6 of the usual construction pocket, provided preferably with standard chevron packing which is compressed by the flange ring 8 upon tightening the bolts 9. The outer end of the piston rod carries the link bracket 10 which is connected by link 11 with the floating lever 12 connected to the valve shaft 13.

In order to guide the piston rod in its movements so as to prevent excessive wear upon the packing, which would result from transverse thrusts of the rod against the packing cylinder and from the weight of the rod itself, I have provided outwardly beyond the packing gland a rigid guide for the rod which is simple in construction, economical and easy to manufacture and which eliminates the cumbersome and expensive crosshead heretofore deemed necessary.

With this end in view, the cylinder end 14 has, preferably formed integrally therewith, an extension in the form of a bracket projecting longitudinally from the cylinder end some distance beyond the packing gland. This bracket is provided near its outer end with a web or bolt pad having holes 16 so that it may be securely bolted to a rigid support.

The bracket carries an elongated hub-like portion 17 forming a bearing for the piston rod in axial alignment with the packing gland and spaced outwardly therefrom. Rigidity to the bearing is added by webs 15 and 18 connecting the transverse web portion 19 of the bearing with the cylinder end. Strengthening webs 20 and 21 also lend rigidity to the structure.

It will be apparent from the foregoing that the piston rod bearing provided affords a rigid guide for the piston rod which prevents the transmission of side thrusts of the rod against the packing, and thereby contributes to the longevity of the packing and to the smooth and frictionless operation of the rod in use.

The details of construction illustrated and described are obviously capable of considerable modification within the scope of the invention as defined in the following claims.

I claim:

1. A combined packing gland and bearing for the piston rod of a pressure cylinder comprising a packing gland located in the cylinder head to prevent leakage along the piston rod reciprocable through said head, a rigid longitudinal extension projecting from said head provided with a piston rod guide bearing aligned with and spaced outwardly from said gland, said extension being provided near its outer end with a vertical web adapted for attachment to a support and provided between said bearing and the cylinder end with longitudinal and transverse strengthening webs.

2. A combined packing gland and guide for the piston rod of the pressure cylinder of a fluid power reverse gear, comprising a packing gland carried by one end of the cylinder through which the piston rod extends, and a rigid longitudinal extension from said cylinder end providing a piston rod guide bearing spaced from said packing gland for protecting said gland from the side thrusts of said rod induced by transverse thrusts against the outer end of the rod beyond the bearing, said extension being provided with longitudinal and transverse strengthening ribs and with a laterally faced offset bolt pad at its outer end for attachment to a support.

THOMAS C. GRAY.